United States Patent
Binder et al.

[11] 3,963,659
[45] June 15, 1976

[54] PRODUCTION OF BITUMEN COMPOSITIONS CONTAINING ETHYLENE-α-OLEFIN RUBBER

[75] Inventors: Gerhard Binder; Harald Blumel; Helmut Krol, all of Marl, Germany

[73] Assignee: Chemische Werke Huls Aktiengesellschaft, Marl, Germany

[22] Filed: Apr. 25, 1975

[21] Appl. No.: 571,725

Related U.S. Application Data

[63] Continuation of Ser. Nos. 421,961, Dec. 5, 1973, abandoned, Ser. No. 291,162, Aug. 22, 1972, abandoned, and Ser. No. 61,663, Aug. 6, 1970, abandoned.

[30] Foreign Application Priority Data
Aug. 6, 1969  Germany............................ 1939926

[52] U.S. Cl. ..................... 260/28.5 AS; 260/42.24; 260/42.33
[51] Int. Cl.² ......................................... C08L 95/00
[58] Field of Search .............................. 260/28.5 AS

[56] References Cited
UNITED STATES PATENTS

| | | |
|---|---|---|
| 2,918,940 | 2/1959 | Carr ............................ 260/28.5 AS |
| 3,336,252 | 8/1967 | Raichle ........................ 260/28.5 AS |
| 3,395,110 | 7/1968 | Crady, Jr. ..................... 260/28.5 AS |
| 3,459,695 | 8/1969 | Hedge ......................... 260/28.5 AS |
| 3,669,918 | 6/1972 | Raley, Jr. ..................... 260/28.5 AS |

OTHER PUBLICATIONS

ECD–330; DuPont Development Co., Products Report No. 18, Dec. 1961, pp. 3, 10, 18, 19.

*Primary Examiner*—Lewis T. Jacobs
*Attorney, Agent, or Firm*—Millen, Raptes & White

[57] ABSTRACT

Homogeneous thermoplastic bituminous compositions containing up to 25 parts by weight of ethylene-α-olefin rubber, e.g. ethylene-propylene rubber, saturated or unsaturated, exhibit improved properties for all asphalt applications, e.g. pipe coating, roads, roofing, etc. The compositions are produced by heating and agitating the bitumen and rubber at above 170° C., preferably 180°–240° C., or by subjecting the rubber to premastication before admixture with the bitumen at lower temperatures. Cross-linkable rubbers can be cross-linked in the bituminous compositions to yield high tensile strength final products.

3 Claims, 1 Drawing Figure

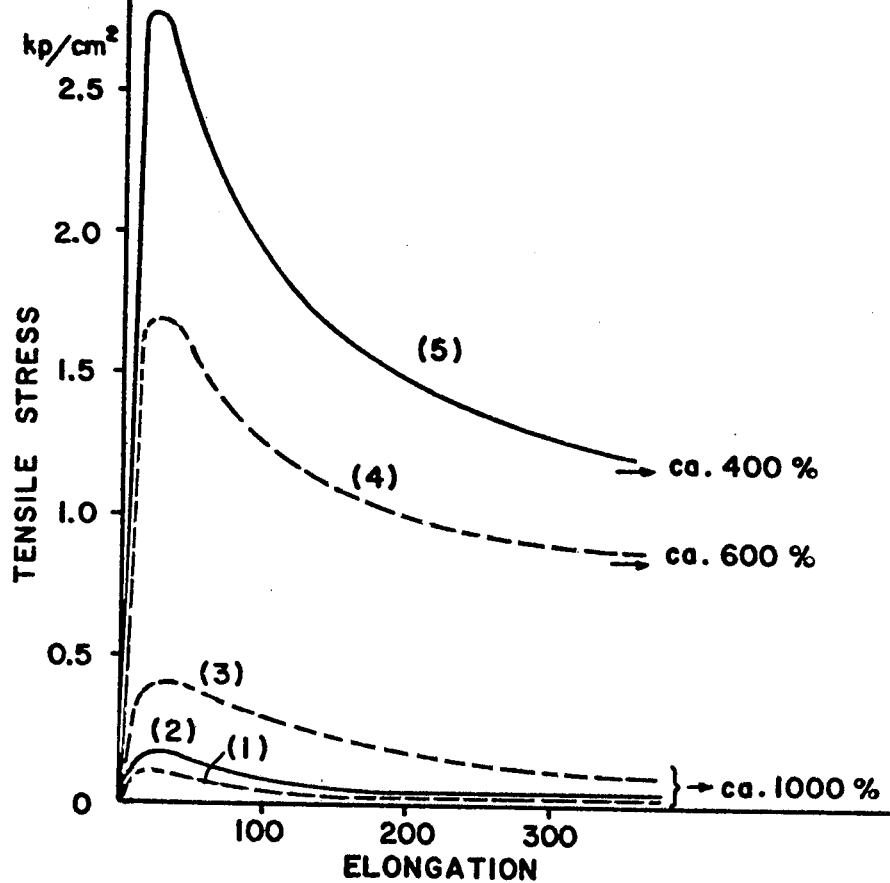

PRODUCTION OF BITUMEN COMPOSITIONS CONTAINING ETHYLENE-α-OLEFIN RUBBER

BACKGROUND OF THE INVENTION

This is a continuation of application Ser. Nos. 421,961, filed Dec. 5, 1973; 291,162, filed Aug. 22, 1972; and 61,663, filed Aug. 6, 1970, all of said applications being now abandoned.

This invention relates to improved thermoplastic compositions of bitumen mixed with rubber, and in particular where the rubber comprises an ethylene-α-olefin elastomer.

It is known that thermoplastic bituminous compositions are utilized extensively, for example in road building. To impart special properties to such road-building compositions, there have been numerous efforts to employ additives such as caoutchouc or rubber (J. Appl. Chem. 7, 481-490 (1957); "Bitumen, Teere, Asphalte, Pech" [Bitumen, Tars, Asphalts, Pitches]1966, Issue 9, Rubber Trend, March 1968).

Likewise known are other bituminous-rubber compositions for diverse fields of application, e.g., concrete joint sealing compounds, runway surfacing materials, bridge surfacing materials, pipe insulation, hydraulic engineering applications, bituminous felt, bituminous coatings, floor coverings, soundproofing compounds, protective undercoating for automobiles, bituminous packing paper, bituminized canisters for acids, chemical containers etc.

Suitable bitumens are primary, high-vacuum, and blown bitumens, tars, and pitches of all types, preferably primary bitumen (straight run asphalts derived from the distillation or solvent precipitation of petroleum). See H. Abraham, Asphalts and Allied Substances, 5th Edition, Volume I, 1945.

Suggested rubber types include natural and specific synthetic rubbers, or, particularly, natural rubber, styrenebutadiene rubber, nitrile rubber, polychloroprene rubber, butyl rubber, and ethylene-vinyl acetate rubber, namely in the form of latices, powders, coarse-structured rubber material made of comminuted bales, and ground or granulated rubber.

The amounts of rubber to be added are normally 3–5%, but they can also be higher, for example when adding tire wastes and reclaimed rubber — which, however, are not dissolved but rather are to be considered as elastic additives.

Most of the above-mentioned rubber compounds exhibit the deficiency that they are degraded or altered under the effect of extended high temperature levels during transport and storage, as well as under the effect of atmospheric ultra-violet radiation or ozone. In any case, such rubbers do not improve the temperature-resistance, ozone resistance or UV-resistance of bituminous compositions. (As known, roofing felts are provided with a layer of gravel, and bituminized pipes are lime-coated in order to protect the bitumen from the effect of the elements.)

Aside from the above deficiencies of such rubbers, it would be desirable to incorporate larger proportions of rubber into the bitumen, this being in many cases economically, but not technologically feasible. For example, the insulation of pipes with bituminous compositions is inadequate, in many instances, thereby necessitating the use of an outer envelope of polyethylene. ("Rohre, Rohrleitungsbau, Rohrleitungstransport" [Pipes, Pipeline Construction, Pipeline Transportation], 5, 125–131 (1966); "Stahlrohre mit Kunststoffummantelung" [Steel Pipes with Plastic Casing] (Mannesmann, Duesseldorf, 1964); DAS [German Published Application]No. 1,228,052.) Furthermore, the welding seams of pipes could be more satisfactorily post-insulated at the building sites by the use of a coating of a high-grade, rubber-modified bitumen. However, many of the above-mentioned rubber types are insoluble if used in the desired quantities, or given rise to considerable difficulties during the mixing step. Also, at elevated temperatures, the mixtures become heterogeneous.

Accordingly, it would be very advantageous to have bituminous compositions having a rubber additive which, though highly effective in small amounts, can also be added in larger quantities to impart even further improved properties for particular applications.

SUMMARY OF THE INVENTION

A principal object of this invention is to provide improved bituminous rubber compositions, e.g. asphalt-rubber compositions, having better properties than those heretofore known.

Another object is to provide one or more improved methods for producing such compositions.

Upon further study of the specification and appended claims, other objects and advantages of the present invention will become apparent.

The above objects are attained by providing bituminous compositions containing an ethylene-α-olefin rubber as the rubber component. Suitable bitumens include, but are not limited to the commercial primary bitumens, blown and unblown. Also, highvacuum bitumen, as well as tars and pitches, can be employed.

Suitable ethylene-α-olefin rubber materials include the conventional atactic copolymers of ethylene and an α-olefin of 3–6, preferably 3–4 carbon atoms, e.g. propylene, butene-1, and methylpentene. Such rubbers generally comprise on a mol basis about 45 to 75, preferably 55 to 65 % ethylene and 25 to 55, preferably 35 to 45 of the α-olefin. Unsaturated rubber can also be employed wherein an unconjugated multiene, e.g. dienes containing 5 to 15 carbon atoms, e.g. dicyclopentadiene, 2-methylene-norbornene and 11-ethyl-1,11-tridecadiene. The multiene, if employed, is generally used in such quantities that the resultant rubber contains about 2 to 20, preferably 3 to 15 carbon to carbon double bonds per 1000 carbon atoms. For additional details regarding such rubbers and their manufacture, attention is invited to the chemical and patent literature, e.g. British Pat. Nos. 810,023 and 836,790 (Montecatini) and U.S. Pat. Nos. 2,933,480; 300,866; 3,093,620; 3,093,621, and 3,211,709 (Du Pont).

The ethylene-α-olefin rubber can be employed as such, or it can also be oil-extended. The oil proportion (conventional mineral oils containing paraffinic and aromatic compounds) can be up to 60% by weight of the total mixture of rubber and oil, preferably 20–40% by weight.

The compositions of this invention contain the rubber in amounts of 0.5 – 25, preferably 1 – 15, especially 1.5 – 12 parts by weight, based on the total mixture of bitumen and rubber. (For purposes of computation, the "rubber" is the weight of rubber added, without the oil proportion, if any, this proportion belonging to the bitumen.)

DETAILED DISCUSSION OF THE INVENTION

The rubber additives essential to the invention impart to the bitumen improved mechanical properties, as well as an excellent resistance against high temperature, ultraviolet radiation, and ozone.

The ethylene-α-olefin rubbers are inert to the ozone present in the air and are superior in this connection to all the above-mentioned prior art rubbers, especially natural and styrene-butadiene rubber.

They are also superior to other rubbers with respect to ultraviolet radiation, and are at least equivalent to comparable polymers made of polychloroprene. It is especially surprising and highly advantageous that the rubbers of this invention, even though employed in minor quantities, transfer their excellent properties to the bituminous compositions, to a large measure.

Also advantageous is the high thermal stability of the ethylene-α-olefin rubbers, which likewise has a very favorable influence on the compositions of this invention. Thus, ethylenepropylene rubber undergoes only minor changes by gelling at 190° C. in a Brabender masticator as compared to polydiene rubbers, such as, for example, styrene-butadiene rubber, polybutadiene rubber, polychloroprene rubber, and nitrile rubber. This kneading at 190° C. represents a stress which is higher, by powers of ten, than the comparatively low stress under which the bitumens are tested according to DIN [German Industrial Standard] 1995 only at 163° C., for 5 hours, without kneading, wherein marked changes are tolerated.

However, extraordinary difficulties are encountered in mixing the ethylene-propylene rubber into the bitumen. Thus, it is impossible to dissolve a commercially available ethylene-propylene rubber having a Mooney viscosity of ML-4 = approximately 70 (DIN 53523) and an unsaturation of 8 double bonds per 1,000 carbon atoms, in a charge of bitumen. The techniques normally helpful for accomplishing the intermixing, especially raising the temperature, or incorporation of the previously mechanically comminuted rubber into a great variety of bitumen types by stirring or kneading, at 130°–180° C., fail completely for all practical purposes with this high mooney viscosity rubber, and result in a solution having only at most about 1–3 % by weight of rubber, if any at all.

Even the incorporation of an ethylene-propylene rubber latex yields only moderate success. Although, at 150° C., mixtures having 1 and 2.5% of rubber to bitumen are still homogeneous after 40 minutes of agitation, segregation phenomena are apparent under the microscope at all concentrations.

Therefore, ethylene-propylene rubber must be considered as very poorly compatible with bitumen, as compared with the above-described prior art rubber types which can readily be dissolved by mixing at least in small concentrations.

As can be seen from the following Table 1, however, even mixtures of bitumen having very low concentrations of ethylenepropylene rubber (EPR) exhibit marked improvements on the bitumen (bitumen 200):

Table 1

|  | Penetration 4° C. | Penetration 25° C. | Softening Point ° C. | Breaking Point ° C. |
|---|---|---|---|---|
| B 200+1 % EPR | 22 | 158 | 39.5 | −17 |
| B 200+2.5 % EPR | 26 | 130 | 44.5 | −23 |
| B 200+5 % EPR | 40 | 120 | 50.5 | −25 |
| B 300 Without Additive |  | 185 | 39 | −15 |

B 200 is a distilled bitumen, penetration 160 to 210 (1/10 mm). The penetration is measured in 1/10 mm at 25°C. (DIN 1995). The softening point is measured by the Ring and Ball Method (DIN 1995). The breaking point is measured by the Fraass Method (DIN 1995).

Bearing in mind the improvement obtainable with small amounts of EPR, a process is now provided whereby the ethylene-α-olefin rubber can be readily incorporated in the bitumen, in larger amounts, and homogeneously. This is done by premasticating the ethylene-α-olefin rubber and adding the bitumen in small proportions or gradually in a continuous fashion.

In order to premasticate and incorporate the bitumen, conventional masticators or rolls can be employed, e.g. masticators with heating facilities and with strong engines, as in Example 1; revolutions per minute: about 40 to 100. The products of the premastication step are at first still rubberlike. During the mastication step, the rubber forms the continuous phase, while the bitumen forms the dispersed phase. Therefore, the bitumen is incorporated into the rubber, forming a homogeneous mixture finally. By this reason the homogenity is reached the earlier the smaller is the bitumen portion in the mixture.

It is advantageous to subject the rubber, during the premastication, to a preliminary homogenization by the addition of a small amount of bitumen or non-volatile mineral oil (up to about 200 parts by weight of the rubber). Especially suitable for this purpose are bitumens of low viscosity, not higher than 500 cSt, preferably not higher than 300 cSt at 150°C., such as tar oils or blended bitumens, B 300, B 200, B 80, as well as non-volatile paraffinic, naphthenic, or aromatic oils. The type of bitumen can be changed in the course of the adding step, during the premastication, as well as when the main amount of bitumen is added. Thus, the type of additive can be selected as required for obtaining the optimum properties of the mixture product. Care must be taken that each charge of bitumen is first completely homogeneously mixed before adding the next charge. Otherwise, lumps of rubber can form, which cannot be readily homogenized again.

The miscibility of the bitumen improves with a reduction in the molecular weight of the rubber. This is manifested in shorter mixing times, a lower consumption of mixing, and a lower spontaneous heating of the mixture. Also, lower-molecular weight types tend less toward segregating than higher-molecular weight types. Accordingly, ethylene-propylene rubber types especially advantageously employed are those having Mooney viscosities (ML-4) of between 5 and 150, preferably 20 and 110, especially between 35 and 90.

Saturated ethylene-α-olefin rubber types are preferred as with these polymers, the segregating tendency is somewhat less.

Also the type of bitumen to be employed (type according to DIN 1995) exerts an influence on the miscibility. However, even with the same DIN specification, a higher content of aromatics, e.g. higher than 20% by weight, preferably in the range of 20 to 40% of the bitumen brings about, for example, the following improvements: somewhat shorter mixing time, a lower energy consumption of the masticator, and a decreased segregation tendency, or a higher permissible storage temperature of the finished composition.

It has furthermore been found that the addition of nonvolatile oils facilitates the mixing in of the bitumen. Nonvolatile oils in this connection also include those of minor volatility, a vapor pressure of less than 20 torr, preferably less than 10 torr at 150° C. Usable oils include but are not limited to nondrying hydrocarbon mineral oils with aliphatic, naphthenic, or aromatic components as well as animal or vegetable nondrying, half-drying, or drying oils of all types (such as coconut oil, palm oil, caster oil, peanut oil, rape-seed oil, soybean oil, linseed oil, hemp-seed oil, marine animal oils). These oils, generally consisting of not more than carbon, hydrogen, and oxygen atoms, are added in amounts of up to 20% by weight, preferably up to 10% by weight, based on the mixture of rubber, bitumen, and oil. In this process, the oil can be mixed in directly as the third component; however, it can be dissolved beforehand in warm bitumen, e.g. 50° to 120° C., or it can be added to the rubber, wherein care must be taken in case of the mineral oils that a total oil proportion of 20% by weight is not exceeded in the final total mixture, if an oil-extended rubber is already being employed.

Drying oils effect an additional strengthening of the compositions and are to be employed especially in those cases where the production of the compositions can be coupled with the manufacture of the final product, such as, for example, in the bituminous felt production for roofing boards and sound proofing materials.

Tar oils or coal tar oils have a favorable behavior with respect to the dissolving effect, but must be carefully taken into account from a processing point of view because of the volatility of their components. Therefore it is necessary to use lower Temperatures, 100° to 120°C. e.g., and preferably the components of such oils are soft bitumens, B 300 to B 80, e.g.. Such mixtures are masticated in closed masticators under the pressure of the vapours or with exhaustion of the vapours.

It proved furthermore to be advantageous to add to the compositions mineral or inorganic fillers, carbon blacks, or sulfur, or to employ mixture components containing such substances. For example, the rubber can be mixed on a rolling mill or in a masticator with finely divided fillers, for example, silicates, e.g. chalk, silicic acid, kaolin, and talc, ground slate, carbon black, and sulfur. Additions of chalk, ground slate, and diatomaceous earth are conventional, in principle, but serve, in the known applications, for obtaining a finely divided rubber powder which does not form lumps and thus dissolves more quickly in hot bitumen due to a larger surface area.

The addition of carbon black as a mixing adjuvant has a surprisingly good effect; this is in contrast to the expectation that carbon black would effect physical cross-linking and thus would make the mixing more difficult. This is not the case; the homogenization is facilitated with the aid of carbon black. Moreover, carbon black provides the additional great advantage that the resistance to ageing is considerably improved.

These additives are employed in amounts of up to 100 parts by weight, based on the mixture consisting of bitumen, rubber and, optionally, oil with preferably up to 70, particularly up to 50 parts by weight being utilized. For the carbon blacks, there are used up to 100, preferably up to 50, particularly up to 20 parts by weight; for the sulfur, up to 20, preferably up to 10, and particularly up to 7 parts by weight are employed.

As described above, the compatibility of ethylene-propylene rubber is reduced with increasing temperature; at temperatures around 150° C. and thereabove, segregation of the mixture takes place. This logically excludes any further elevation of the temperature to improve the solubility. Any further increase in temperature is also inadvisable for the reason that rubbers — to a lesser extent even ethylene-propylene rubber — begin to degrade or cross-link at elevated temperatures.

Therefore, it is surprising that it was furthermore found that it is possible to mix the rubber with the bitumen at temperatures of above 170° C., preferably between 180° and 240° C., especially between 200° and 220° C.

As can be seen from Table 2, the rubber types having a low Mooney value enter into the solution when simply subjected to stirring, whereas kneading is successful in all cases. In this connection, 50 g. portions of rubber in selected particle sizes is heated under stirring in 125 g. portions of bitumen B 300 to 220° C. The agitation is conducted steadily, by hand. The times required by the mixtures starting from 180° C. to the formation of a homogeneous solution are set forth in the table. Additional heating and a further addition of bitumen result in an only limited success, insofar as only minor additional amounts of about 3% enter the solution, and the bitumen is somewhat elasticized. The quantitative ratio of bitumen/rubber plays a subordinate role in the solubility of rubbers having low Mooney viscosities. With ethylene-propylene low Mooney viscosity rubber, in particular, the solution is accomplished practically in all quantitative ratios and with all types of bitumen.

All rubber types set forth can be dissolved in the masticator at 180°–220° C., even if larger amounts of bitumen are charged together with the rubber, or when the rubber is added into the hot bitumen.

Table 2

Solubility of Ethylene-Propylene Rubbers at 180→ 220° C. in B 300 Under Agitation or Mastication.

| Ethylene-Propylene Rubber | | | Solution by Means of | |
| --- | --- | --- | --- | --- |
| | | | Agitation | Mastication |
| ML-4 | C=C/1000 | Particle Size (mm.) | Time (Minutes) | |
| 23 | 0 | 2–3 | yes | 14 | yes |
| 23 | 0 | 5 | yes | 17 | yes |
| 23 | 0 | 20 ×40 ×70 | yes | 35 | yes |
| 21 | 3.2 | 1–2 | yes | 13 | yes |

Table 2-continued

Solubility of Ethylene-Propylene Rubbers at 180 – 220° C. in B 300 Under Agitation or Mastication.

| Ethylene-Propylene Rubber | | | Solution by Means of | | |
|---|---|---|---|---|---|
| ML-4 | C=C/1000 | Particle Size (mm.) | Agitation | Time (Minutes) | Mastication |
| 21 | 3.2 | 5 | yes | 16 | yes |
| 21 | 3.2 | 25×40 ×55 | yes | 38 | yes |
| 49 | 0 | 2–4 | moderate | >45 | yes |
| 49 | 0 | 6 | minor | >45 | yes |
| 50 | 5.1 | 2–4 | moderate | >45 | yes |
| 50 | 5.1 | 5 | minor | >45 | yes |
| 72 | 4.7 | 2–3 | minor | >45 | yes |
| 86 | 8.5 | 2–3 | very minor | >45 | yes |
| 70*) | 8 | 2×6×6 | minor | >45 | yes |

*)Oil Rubber, ML-4 = 70, consisting of 2 parts by weight of unsaturated ethylene-propylene rubber, ML-4 about 140, 8 C=C/1000 C, and 1 part of oil.

It can clearly be seen from Table 2 that the molecular weight (represented by the Mooney visocity ML-4) has a decisive influence on the solubility at high temperatures. Medium- and high-molecular weight types are dissolved so slowly that they harden on the surface, and can then only be solubilized by means of forced mixing devices (high power agitators, masticators, rolling mills).

The particle size exerts a secondary influence and has only an effect on the time required for the dissolution. In connection with the process selected in each particular case, the decision must be made whether it is simpler to comminute the rubber mass or to tolerate longer dissolving times. Further experiments have shown that the rubber types with Mooney viscosities ML-4 of about 50 and even somewhat higher can still be brought into solution with mechanical agitating devices, impeller stirrers, etc. Accordingly, types of up to ML-4 = 60 are preferred.

Oil rubbers on an ethylene-propylene basis exhibit a behavior which is approximately in correspondence with the Mooney viscosity thereof. This means that substantially higher molecular weights of the pure rubber can be incorporated when they already contain oil from the production thereof.

Also, for the processes for dissolving the rubber at high temperatures, the above-described measures can be employed, such as the addition of powders, carbon black or sulfur, the addition of drying or nondrying oils, an additional reduction of the molecular weight of the rubber, and the use of bitumens or oils having aromatic components. It is also possible to mix the rubber in by means of forced mixers, such as high power agitators, masticators, rolls, or the like; however, in general, normal mixers or stirring units, without a forced mixing, masticating, or rolling effect are sufficient. Especially in the latter case, it is advisable to employ an ethylene-propylene rubber having Mooney viscosities of ML-4 of below 60, preferably below 45, particularly below 35. It is furthermore advantageous to add the rubber in particles having a minimum dimension below 20, preferably below 10, especially below 5 mm.

The term ethylene-propylene rubber is understood to mean saturated types, as well as types which are unsaturated in view of vulcanizability, containing, in addition to the two main starting components, a diene polymerized therein, the number of the cross-linkable double bonds thereof being 0.5 – 20, preferably 1.5 – 15, particularly 2.5 – 10 per 1,000 carbon atoms. This rubber can be cross-linked after being incorporated in the bituminous mixture, which is rather unexpected. Furthermore, it is not obvious to add cross-linkable rubbers because of the possibility of cross-linking during the hot mixing step which presumably would prevent solubilization of the rubber and/or heavy going in the mixing step. Furthermore, one would have expected that the polymers would be cross-linked at least by the end of the mixing step, thereby resulting in permanently stiff products which could not be used in the intended manner, e.g. by coating with a heated, spreadable mass.

Surprisingly, however, when the additives are suitably metered, the thus-obtained products can still be processed, but exhibit, at the usual utilization temperatures, rubber-like properties within a wide range. The properties of the cross-linked bituminous compositions are special insofar as their stress-deformation curves in the tentile strength test deviate substantially from the typically viscous curve of the pure bitumen or also of the non-cross-linked bitumen-rubber mixture. In this respect the cross-linked compositions exhibit much higher tensile strengths.

The cross-linking can be conducted with conventional rubber vulcanization systems, such as, for example, sulfur, if desired in conjunction with metallic oxides, e.g. zinc oxide and lead oxide, with higher fatty acids, e.g. stearic acid and lauric acid, and with vulcanization accelerators, e.g. thiuram mono-, di-, and tetrasulfide, benzothiazole, amines, triazines, sulfenamides, dithiocarbamates, dithiophosphates, and others.

The cross-linking — also of the mixtures with saturated ethylene-propylene copolymers — with peroxides, such as, for example, dicumyl peroxide, 1,3-bis(-tert.-butylperoxyisopropyl) benzene, optionally with the addition of coagents, such as sulfur or triallyl isocyanurate, is possible. Blowing in air or atmospheric oxygen during the mixing procedure at an elevated temperature results in partial cross-linking, but does not produce products as elastic as those obtained in the above-described cross-linking processes.

It is remarkable that according to the conventional determination methods, little or no gel proportion is found, despite their typically rubber-like behavior, in the products cross-linked with conventional systems, peroxides, or air, or in the noncross-linked products.

Suitably, the cross-linking is conducted during the production of the mixture, for example between the individual steps of adding bitumen. On the other hand, the cross-linking agents can also be added at temperatures below the cross-linking temperature, in order to maintain the mass in a condition of better processability, and the cross-linking step can take place only shortly prior to, or during, the final processing, preferably by temperature elevation.

The non-cross-linked partial mixture, or the finished cross-linked mixture, can additionally be mixed with further amounts of bitumen, or with a non-cross-linked mixture.

THE DRAWING

The attached drawing is a graph of the stress-elongation characteristics of compositions which demonstrate the unexpected properties of products of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

125 g. of ethylene-propylene rubber, ML-4 = 70, 8 C=C bonds per 1,000 carbon atoms, is cut into pieces of about 2 × 2 × 5 cm. in size, and homogenized in a masticator (with Z-shaped vanes, type "Meili DKa 10r", content 1 liter), without heating. In the absence of any additional heating, a total of 875 g. of bitumen B 200 having a temperature of 60° C. is added in portions of about 100 g. each. The bitumen is added first in intervals of about 7 minutes, and later of about 5 minutes. The mass reaches a mixture temperature of about 60° C. due to spontaneous heating and the addition of bitumen. The total mixing period is about 60 minutes. The composition is non-tacky at room temperature. It is completely homogeneous, and smooth on the surface.

Its properties, according to DIN 1995, are:
softening point (ring and ball): 69° C.
breaking point (according to Fraass): below −40° C.
  (Note: The method according to Fraass (DIN 1995) is insufficient for characterizing the low-temperature brittleness. The test specimens wherein "below −40° C." is indicated do not break within the measuring possibilities of up to −43° C.)
penetration (25° C.): 54
ductility (25° C.): 35 cm.

EXAMPLE 2

200 g. of ethylene-propylene rubber, ML-4 = 49, without a diene component, is homogenized in pieces of about 1 × 1 × 3 cm. with 100 g. of bitumen 200 in the masticator described in Example 1, at 50° C. Masticating period: about 20 minutes. Another 700 g. of B 200 is heated to 70° C. and intermixed by kneading during the course of 25 minutes, first gradually, and then more rapidly. In this step, the temperature is increased to 120° C.

The properties of this mixture according to DIN 1995 are:
softening point (ring and ball): 85° C.
breaking point (according to Fraasss): below −40° C.
penetration (25° C.): 26
ductility (25° C.): 24 cm.

EXAMPLE 3

500 g. of the mixture from Example 2 (consisting of 100 g. of EPR and 400 g. of B 200) is heated in a masticator to 120° C. and mixed, during the course of 15 minutes, with another 500 g. pf B 200.

The properties of this mixture according to DIN 1995 are:
softening point (ring and ball): 64° C.
breaking point (according to Fraass): below −40 ° C.
penetration (25° C.): 76
ductility (25° C.): 44 cm.

EXAMPLE 4

200 g. of ethylene-propylene rubber, ML-4 = 23, without a diene component, is homogenized in a masticator at 120° C. during the course of about 15 minutes, with the addition of 100 g. of SRF black [semireinforcing furnace black] in small proportions. 800 g. of bitumen 200 is added during 25 minutes, as described in Example 2. The mixture is divided and mixed, as in Example 3, with another 500 g. of B 200 (4a) and B 25 (4b), respectively. The properties of this mixture according to DIN 1995 are:

|  | 4a | 4b |
| --- | --- | --- |
| Softening point (ring and ball) | 72° C. | 78° C. |
| Breaking point (acc. to Fraass) | below −40° C. | below −40° C. |
| Penetration (25° C.) | 66 | 45 |
| Ductility (25° C.) | 37 | 26 |

EXAMPLE 5

100 g. of ethylene-propylene rubber, ML-4 = 70, 8 double bonds per 1,000 carbon atoms, is homogenized in a masticator without heating. 100 g. of paraffin oil is added in small batches. The mixing time up to this point is 20 minutes. With the temperature raised to 120° C., 600 g. of bitumen 80 is added during the course of another 30 minutes.

The properties of this mixture according to DIN 1995 are:
softening point (ring and ball): 73° C.
breaking point (according to Fraass): below −40° C.
penetration (25° C.): 110
ductility (25° C.): 29 cm.

EXAMPLE 6

100 g. of bitumen 300 is mixed with 40 g. of ethylene-propylene rubber, ML-4 = 21, 3.2 double bonds per 1,000 carbon atoms, in the form of finely divided crumbs having a particle size of 1–2 mm., and the mixture is heated during the course of about 15 minutes, under vigorous agitation, to 200° C., until the mixture is homogeneous. Thereafter, another 260 g. of B 300 is added thereto, and the mixture is stirred for another 3 minutes. The mass is homogeneous and smooth.

The properties of this mixture are, according to DIN 1995:
softening point (ring and ball): 58° C.
breaking point (according to Fraass): below −40° C.
penetration (25° C.): 99
ductility (25° C.): 60 cm.

tensile strength (23° C.): 0.09 kp/cm²
elongation at rupture (23° C.): >1,000 percent

EXAMPLE 7

100 g. of the mixture according to Example 6 is heated to 160° C. One gram of tetramethylthiuran disulfide, 1 g. of sulfur, and 5 g. of zinc oxide are added thereto, and the mixture is heated, under agitation, to 180° C. After 4 minutes, the mixture begins to gel markedly; thereafter, the mixture is further stirred at moderate speed for 20 minutes. After cooling, the mass is rubbery.

The properties of this mixture are, according to DIN 1995:
softening point (ring and ball): 63° C.
breaking point (according to Fraass): below −40° C.
penetration (25° C.): 76
ductility (25° C.): 38 cm.
tensile strength (23° C.): 0.4 kp/cm²
elongation at rupture (23° C.): >1,000%

EXAMPLE 8

100 g. of the mixture according to Example 6 is treated as in Example 7, but using 2 g. of tetramethylthiuram disulfide, 2 g. of sulfur, and 100 g. of zinc oxide. The composition, after cooling, is more rubbery than that of Example 7.

The values obtained according to DIN 1995 are:
softening point (ring and ball): 98° C.
breaking point (according to Fraass): below −40° C.
ductility (25° C.): 34 cm.
penetration (25° C.): 40
tensile strength (23° C.): 1.7 kp/cm²
elongation at rupture (23° C.): about 600 percent

EXAMPLE 9

100 g. of ethylene-propylene rubber, ML-4 = 21, 3.2 double bonds per 1,000 carbon atoms, is homogenized in a masticator within approximately 15 minutes. At about 60° C., 20 g. of powdered sulfur and 900 g. of bitumen 80 are added in batches of about 200 g. Each batch is homogeneously kneaded into the mixture prior to adding the subsequent batch. The addition procedure takes about 30 minutes. The mixture is heated to 150° C. and, after the addition of 40 g. of zinc oxide, 10 g. of sulfur, and 10 g. of tetramethylthiurem disulfide, it is kneaded for 30 minutes at 150°–160° C. The cooled mass is stiff, but rubbery.

The properties of the thus-obtained mass are:
softening point (ring and ball): 103° C.
breaking point (according to Fraass): below −40° C.
ductility (25° C.): 20
penetration (25° C.): 21
tensile strength (23° C.): 2.75 kp/cm²
elongation at rupture (23° C.): about 400 percent

EXAMPLE 10

In order to obtain dilute solutions of 1–3% of ethylenepropylene rubber, the 10% mixture in B 80 from Example 9 is further diluted with bitumen B 80.

90 (70) g. of B 80 is heated to 120° C. and 10 (30) g. of the mixture of Example 9 is added in lumps. The lumps are readily dissolved, after having assumed the temperature, and can br rapidly homogeneously incorporated into the mixture by manual stirring. Stirring time after the addition: 5 minutes.

The properties of the dilute mixtures according to DIN 1995 are set forth in the table:

|  | B 80 | 1% Rubber | 3% Rubber |
|---|---|---|---|
| Softening point (ring and ball) | 52° C. | 54° C. | 60° C. |
| Breaking point (Fraass) | −13° C. | −15° C. | −20° C. |
| Ductility (25° C.) | >100 cm. | 44 cm. | 28 cm. |
| Penetration (25° C.) | 71 | 52 | 39 |

Tensile strength (23° C.): 0.15 kp/cm²
Elongation at rupture (23° C.): >1,000%

EXAMPLE 11

20 g. of ethylene-propylene rubber, ML-4 = 23, without a diene component, in the form of crumbs of a diameter of about 5 mm., is dissolved by hand, under agitation, with 50 g. of bitumen 300 and 60 g. of chalk, at 200–220° C. within about 20 minutes. The mixture is homogeneously mixed by stirring at 130° C. with another 130 g. of bitumen 300, within about 3 minutes.

The properties of the thus-obtained mass are as follows:
softening point (ring and ball): 61° C.
breaking point (according to Fraass): below −40° C.
ductility (25° C.): 37 cm.
penetration (25° C.): 85

EXAMPLE 12

20 g. of ethylene-propylene rubber, ML-4 = 23, without any double bonds, is dissolved with 50 g. of bitumen 300 and 60 g. of chalk, as described in Example 11. The mixture is homogeneously mixed, under agitation, at 150° C., with another 130 g. of bitumen 300 and another 80 g. of chalk, within about 3 minutes.

The properties of the thus-obtained mass are:
softening point (ring and ball): 66° C.
breaking point (according to Fraass): below −40° C.
ductility (25° C.): 31 cm.
penetration (25° C.): 63

EXAMPLE 13

20 g. of ethylene-propylene rubber, ML-4 = 23, without a diene component, in crumbs of about 5 mm. in diameter, is dissolved with 20 g. of "Naftolen MV" (oil rich in aromatics, having an aromatic content of >40%, made by Metallgesellschaft), 30 g. of bitumen 300, and 60 g. of chalk, within about 15 minutes, at 200–220° C. The mixture is homogeneously mixed by stirring at 130° C. with another 130 g. of bitumen 300, within about 3 minutes.

The properties of the thus-obtained composition are:
softening point (ring and ball): 55° C.
breaking point (according to Fraass): below −40° C.
ductility (25° C.): 37 cm.
penetration (25° C.): 133

EXAMPLE 14

20 g. of ethylene-propylene rubber, ML-4 = 21, 3.2 double bonds per 1,000 carbon atoms, in the form of crumbs having a diameter of 1–2 mm., is dissolved, within about 15 minutes, with 20 g. of Naftolen MV, 30 g. of bitumen 85/40, and 60 g. of chalk, at 200–220° C. The mixture is homogeneously mixed by stirring at 150° C. with another 130 g. of bitumen 85/40 within about 3 minutes.

The properties of the thus-obtained mass are:
softening point (ring and ball): 106° C.
ductility (25° C.): 5 cm.
penetration (25° C.): 33

EXAMPLE 15

130 g. of the mass of Example 14 (10 parts of rubber, 80 parts of bitumen 85/40, 10 parts of Naftolen MV plus 30 parts of chalk) is mixed with an excessive dosage of crosslinking agent (10 parts of sulfur, 5 parts of tetramethylthiuram disulfide, 20 parts of zinc oxide) and stirred for 10 minutes at 180° C. Thereafter, another 90 g. of B 85/40 is incorporated by stirring. The composition is not smooth anymore at room temperature, is extremely viscous up to 150° C., and can only be further processed by rolling or kneading.

The properties, according to DIN 1995, are:
softening point (ring and ball): 142° C.
ductility (25° C.): 2 cm.
penetration (25° C.): 12

EXAMPLE 16

130 g. of the composition according to Example 14 (10 parts of rubber, 80 parts of B 85/40, 10 parts of Naftolen MV plus 30 parts of chalk) is mixed with 2 parts of sulfur, 2 parts of tetramethylthiuram disulfide, and 10 parts of zinc oxide, and stirred for 10 minutes at 160°–170° C. Thereafter, another 90 g. pf B 85/40 is incorporated by agitation.

The properties, according to DIN 1995, are:
softening point (ring and ball): 115° C.
ductility (25° C.): 5 cm.
penetration (25° C.): 16

If, in the above examples, the chalk is substituted by finely divided silicic acid, kaolin, talc, ground slate, or carbon black, comparable products are obtained; if the proportion is increased to up to 100 parts by weight, based on the bitumen-rubber mixture = 100 parts by weight, the compositions become increasingly stronger and stiffer, the softening point is raised, and the penetration value is lowered.

Various types of bitumens can be employed. Not only petroleum asphalt can be employed, but also asphalts from asphalt seeps, such as from the Bermudez Pitch Lake in Venezuela, and the Trinidad Asphalt Lake, as well as from asphalts which are derived from sandstones and the like; straightrun asphalts derived by distillation or solvent precipitation; air-blown asphalts prepared by reacting with air at 400°–600° F., being resilient and having a flatter viscosity-temperature curve than the straight-run asphalts; and cracked asphalts prepared by heating to 800°–1000° F..

Such bitumens are described in McGraw-Hill Encyclopedia of Science and Technology, McGraw-Hill Book Company, Inc., Volume 1, Page 590–591, 1960, and in Bitumen- und Asphalt-Taschenbuch, third Edition 1964, Bauverlag GmbH Wiesbaden-Berlin, pages 21 to 27.

The names B 300, B 200 etc. . . . B 15 are indications for the penetration at 25° C. measured in 1/10 mm. and are normed in German DIN 1995. Similar definitions are given by A.A.S.H.O. (American Association of State Highway Officials).

The compositions obtained by the present invention are true solid solutions, as opposed to the microscopically segregated compositions of the prior art. In the prior art, it may have been tried to incorporate portions of less than 5 % rubbers into bitumens, but it was not possible to obtain homogeneous solutions. Till now, portions of about 3 % by weight, preferably 5 to 50 %, ethylene-propylene rubber and ethylene-propylene-diene rubber were not incorporated, and even other rubbers are difficult to be incorporated.

The novel products are useful for filling any fissures in overground buildings, for the road and street construction, especially for highly elastic coatings and for provisional roads and bridges, for air bases, for filling of pipe fittings and cable fasteners, for impregnating of roofing felts, for hydraulic structures and dam constructions, foils for roof protection and isolation (especially when containing 10 to 20 % by weight of rubber or vulcanized rubber), for sticking together roof foils and isolating foils, especially foils made from rubbers, even from polyisobutylene or from butyl rubber, and for engine foundations.

There are two specific methods for producing the compositions, on the one hand by premastication, and on the other hand by high temperature mixing. When high temperature mixing at above 170° C. is employed, a premastication step is unnecessary.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a homogeneous thermoplastic composition consisting essentially of on a 100 parts by weight basis about 75–99.5 parts bitumen and about 0.5–25 parts of an ethylene-α-olefin rubber having a Mooney viscosity (ML-4) of 35–90 and comprising on a mol basis 45–75% ethylene and 25–55% of propylene and having cross linkable double bonds said process comprising the steps of:

premasticating the ethylene-α-olefin rubber and during said premasticating adding a small amount of bitumen to obtain preliminary homogenization;

adding a small amount of bitumen to the premasticated rubber and masticating the resultant mixture to disperse the bitumen as a dispersed phase into the rubber as a continuous phase and continuing the mastication to form a homogeneous mixture;

and adding additional bitumen either in incremental batches, or gradually in a continuous manner and at a rate such that each charge of bitumen is first homogeneously mixed before adding additional bitumen, and changing the type of added bitumen from a less viscous type to a more viscous type during the step of adding same, and continuing the mastication to produce the homogeneous thermoplastic composition.

2. A process according to claim 2, further comprising employing mineral or inorganic fillers, carbon black, or sulfur in said compositions.

3. A process according to claim 1, wherein per 100 parts by weight of bitumen-rubber there are employed up to 100 parts by weight of filler, 100 parts by weight of carbon black and/or 20 parts by weight of sulfur.

* * * * *